(12) United States Patent
Kazmi et al.

(10) Patent No.: US 8,184,578 B2
(45) Date of Patent: May 22, 2012

(54) DYNAMIC INTER-CELL CHANNEL SHARING

(75) Inventors: Muhammad Ali Kazmi, Bromma (SE); András Rácz, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 912 days.

(21) Appl. No.: 12/158,970

(22) PCT Filed: Dec. 22, 2005

(86) PCT No.: PCT/SE2005/002002
§ 371 (c)(1),
(2), (4) Date: Jul. 25, 2008

(87) PCT Pub. No.: WO2007/073250
PCT Pub. Date: Jun. 28, 2007

(65) Prior Publication Data
US 2009/0005058 A1    Jan. 1, 2009

(51) Int. Cl.
*H04W 4/00* (2009.01)

(52) U.S. Cl. ...... 370/329; 370/338; 455/63.3; 455/63.2; 455/62

(58) Field of Classification Search .................. 370/329, 370/338, 335, 310, 318, 320, 328, 342, 280, 370/337, 340; 455/452.1, 452.2, 63.3, 63.2, 455/62
See application file for complete search history.

(56) References Cited

U.S. PATENT DOCUMENTS

| 2001/0055297 | A1 | 12/2001 | Benveniste |
| 2004/0202130 | A1 | 10/2004 | Backes et al. |
| 2005/0058097 | A1* | 3/2005 | Kang et al. ............... 370/329 |
| 2007/0105562 | A1* | 5/2007 | Ji ............................ 455/452.1 |
| 2008/0287130 | A1* | 11/2008 | Laroia et al. ............. 455/436 |

FOREIGN PATENT DOCUMENTS

| JP | 2003-259429 A | 9/2003 |
| JP | 2004-032428 A | 1/2004 |

OTHER PUBLICATIONS

Chuang, et al. Power Control for Dynamic Packet Assignment in Advanced Cellular Internet Service. Vehicular Technology Conference 1998. May 18, 1998.

* cited by examiner

*Primary Examiner* — Huy D Vu
*Assistant Examiner* — Dady Chery (57) ABSTRACT

A mechanism to share channels between cells dynamically and without simultaneous allocation of the same channel by more than one access point achieved by a method for a dynamic inter-cell channel sharing for a first access point in a radio access network, the first access point being associated with a first cell of a number of cells within the radio access network, the first access point being adapted to connecting at least one first user equipment being situated in the first cell, to a network infrastructure, comprising the steps of: receiving from the at least one first user equipment a report indicating whether a specific channel is used in a second adjacent cell of said number of cells, the report being based on a first information sent from at least one second access point, the information indicating whether a specific channel is used in the second adjacent cell.

29 Claims, 7 Drawing Sheets

DYNAMIC INTER-CELL CHANNEL SHARING

TECHNICAL FIELD

The present invention relates generally to a method and arrangement for an access point in a cellular radio access network and a method and arrangement for a user equipment in the cellular radio access network. In particular it relates to dynamic inter-cell channel sharing in the radio access network.

DESCRIPTION OF RELATED ART

During frequency planning, channels are assigned to cells such that adjacent cells are assigned different channels and the same channel is reused only in cells with k cells distance away (k-reuse described in US 2005/0096062). A drawback of the fixed channel partitioning achieved by frequency planning is that only a fraction of the spectrum is available in a cell and there is no possibility to make the entire spectrum available in one cell even if the channels in adjacent cells are momentarily unused. Therefore the fixed partitioning of frequencies results in under utilization of radio channels in many cases.

A more sophisticated version of the classical frequency partitioning method is the use of multiple reuse partitions in the same cell. In this case a cell is divided into two regions. In the inner part of the cell the frequency reuse is one whereas in the outer part (cell border region) the reuse is larger than one (k-reuse). Such a method is described in US 2002/0119781 A1, depicting a method to be used in Orthogonal Frequency Division Multiple Access (OFDMA) based systems for the allocation of carriers to different users. The user equipment performs measurements on the available carriers, measuring the signal quality on reference symbole channels, for instance the signal-to-noise ratio (SNR) and traffic load measurements, which they feed back to their own access points. Then the access point makes the scheduling decision and assigns carriers to the users. However, this scheme is primarily for downlink, and it does not address the issue of any cooperative behaviour between access points in order to avoid the simultaneous allocation of the same carrier. Another disadvantage is that it assumes a k-reuse system with fixed allocation of channels to cells. The main advantage of this approach is that on the one hand channels are more efficiently utilized and on the other hand the interference in the cell border is minimized. However, the allocation of channels to cells is still fixed.

If more dynamic allocation of channels is required there are a variety of Dynamic Channel Allocation (DCA) schemes available in prior art. Common to these schemes is that they allocate channels to user equipment communications dynamically, depending on e.g. the traffic demands on the available channels, on the channel quality, etc. The DCA schemes vary depending on the time dynamics of channel allocation, the distributed or centralized nature of the scheme, the parameters and measurement information used as input for the decision, etc.

Such a DCA scheme is depicted in US2005/0058097 using an orthogonal frequency division multiple access network, which is to be used for assigning sub-channels in an OFDMA based systems to users in different cells. In this method, a central controller entity is assumed, e.g., a Radio Network Controller (RNC), which assigns the channels such that no conflict occurs between cells. The problem with this solution is that it requires a central entity, the RNC that coordinates the allocation, which means higher complexity.

SUMMARY

It is therefore an object of the present invention to provide a mechanism to share channels between cells dynamically, without simultaneous allocation of the same channel by more than one access point and without requiring a central entity that coordinates the allocation.

In accordance with the present invention, the object is achieved by a method for a dynamic inter-cell channel sharing for a first access point in a radio access network, the first access point being associated with a first cell of a number of cells within the radio access network, the first access point being adapted to connect at least one first user equipment being situated in the first cell, to a network infrastructure, comprising the steps of: receiving from the at least one first user equipment a report indicating whether a specific channel is used in a second adjacent cell of said number of cells, the report being based on a first information sent from at least one second access point associated with the second adjacent cell, the first information being detected by the first user equipment and which information indicates whether a specific channel is used or not in the second adjacent cell.

In accordance with the present invention, the object is also achieved by a method for a dynamic inter-cell channel sharing for a first user equipment in a radio access network, the radio access network comprising a number of cells, the first user equipment being situated in a first cell of said number of cells, the first user equipment is connectable to a network infrastructure via a first access point associated with the first cell, the method comprising the steps of: detecting if a first information is sent from at least one second access point associated with a second cell of said number of cells, the second cell being adjacent to the first cell, the first information indicating whether a specific channel is used or not in the second adjacent cell, and sending a report regarding whether the specific channel is used in the second adjacent cell or not, to the first access point being situated in the same first cell as the first user equipment, based on the detected first information.

In accordance with the present invention, the object is also achieved by an arrangement for a dynamic inter-cell channel sharing in a first access point in a radio access network, the first access point being associated with a first cell of a number of cells within the radio access network, the first access point being adapted to connect at least one first user equipment being situated in the first cell, to a network infrastructure, the access point arrangement comprising means for receiving from the at least one first user equipment a report indicating whether a specific channel is used in a second adjacent cell of said number of cells, the report being based on a first information sent from at least one second access point associated with the second adjacent cell, the information being detected by the user equipment and which information indicating whether a specific channel is used or not in the second adjacent cell.

In accordance with the present invention, the object is also achieved by an arrangement for a dynamic inter-cell channel sharing in a first user equipment in a radio access network, the radio access network comprising a number of cells, the first user equipment being situated in a first cell of said number of cells, the first user equipment is connectable to a network infrastructure via a first access point associated with the first cell, the user equipment arrangement comprising: means for detecting if a first information is sent from at least one second access point associated with a second cell of said number of cells, the second cell being adjacent to the first cell, the first information indicating whether a specific channel is used or not in the second adjacent cell and means for sending a report regarding whether the specific channel is used in the second adjacent cell or not, to the first access point, based on the detected first information.

Since the first user equipment detects if the second access points in adjacent cells are using a specific channel and reports that to the first access point, and the first access point selects the specific channel if it is not used in an adjacent cell according to the report, channels can be shared between cells dynamically, without simultaneous allocation of the same channel by more than one access point and without requiring a central entity that coordinates the allocation.

An advantage of the present invention is that the radio channels between the cells are shared dynamically depending on the current load in each cell such that no inter-cell interference occurs. The inefficiencies of a static allocation are avoided.

Another advantage of is that the scheme of the present invention does not require a central coordination entity or signalling communication between the access points. Each access point can decide on channel assignment autonomously. Nevertheless, the efficiency of channel sharing could be as good as with a central controller or with central scheduling entity.

Another advantage of the present invention is that the scheduling decision remains in the access point, so all the advanced link adaptation, frequency domain scheduling etc., mechanisms can be used.

Another advantage of the present invention is that the user equipments need to perform only simple finding out if a channel is used by reference symbol sensing or broadcast channel reception and there is no need to maintain signalling communication with neighbour access points. The user equipment does not necessarily have to do the detecting continuously but when required by the access point. The scheme according to he invention does not introduce additional measurement load on the user equipment, since the user equipment anyway has to do similar reference symbol measurements for other reasons as well (e.g., channel estimation, link adaptation).

DETAILED DESCRIPTION OF PREFERRED EMBODIMENTS

In cellular systems, frequency reuse is typically employed to avoid inter-cell interference. The frequency spectrum is divided into a number of frequency bands, where each cell gets assigned a subset of the available bands. In a more general interpretation of frequency reuse the radio channel to be shared between cells can be a code in case of Code Division Multiple Access (CDMA) or a time-frequency grid (chunk) in Orthogonal Frequency Division Multiplexing (OFDM). The term channel will be used to refer to such a piece of the radio channel in general.

Figure 1:
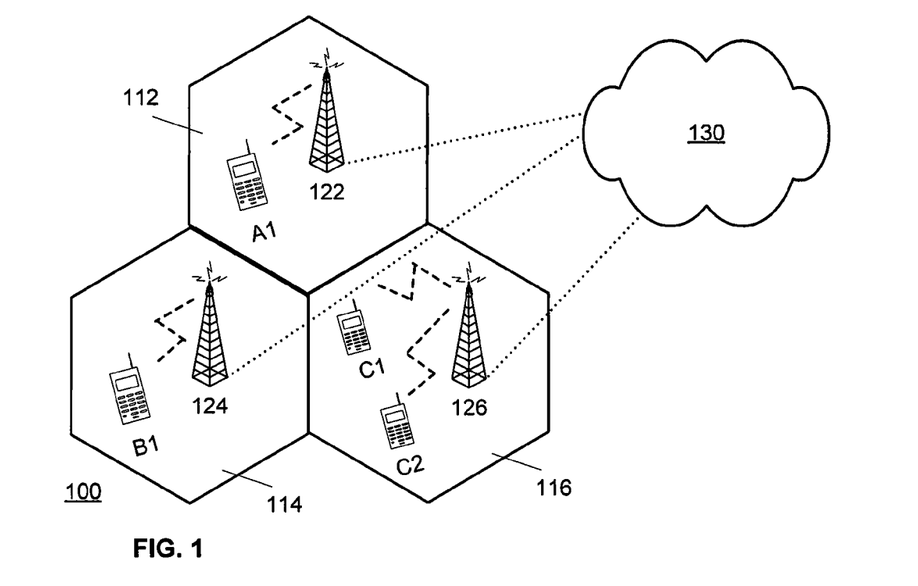
FIG. 1 is a schematic block diagram illustrating a radio access network according to the present invention.

FIG. 1 depicts a radio access network 100 comprising a number of cells of which cells 112, 114 and 116 are depicted in FIG. 1, and which radio access network 100 uses technologies such as e.g. Code Division Multiple Access (CDMA) or Orthogonal Frequency Division Multiplexing (OFDM).

The radio access network 100 further comprises, associated with each of the number of cells 112, 114 and 116, a respective access point 122, 124 and 126. The access points are connectable to an infrastructure network 130 such as e.g. the Public Switched Telephone Network (PSTN), an IP network or a radio access network.

A number of user equipments A1, B1, C1, C2 are located under radio coverage of the radio access network 100 and are connectable to the infrastructure network 130, by means of the associated with the cell in which it is currently positioned. In the current scenario in FIG. 1, the user equipment A1 in cell 112 is connectable to the infrastructure network 130 via access point 122, the user equipment B1 in cell 114 is connectable to the infrastructure network 130 via access point 124, the user equipment C1 and C2 in cell 116 are connectable to the infrastructure network 130 via access point 126. The user equipments may be mobile terminals, personal digital assistants (PDA), laptop computers or any type of device capable of communicate radio resources.

When any access point in a cell (any of the access points in FIG. 1) is using a specific channel, the access point sends out information indicating that the specific channel is used, i.e. occupied. This may be performed by defining signal symbols and send reference symbols on a down link channel or by sending out the information by using a broadcast channel. These methods will be described more in detail below. This information, sent out by the access points in the radio access network 100 is receivable by the user equipments in adjacent cells, i.e. cells adjacent to the cell that is associated with the access point sending the information. The user equipments receiving this information report the information to the access point of the cells they are communicating with. This means that the access point receive information, from all user equipments in its cell, whether a channel is occupied in adjacent cells and accordingly can refrain from using that channel and thereby avoid channel interference. This enables a dynamic inter-cell channel sharing. The access point may set from which channels it wants to receive reports about by telling the user equipment the identities of the channels/reference symbols or set from which N adjacent access points it wants reports about by telling the user equipment the identities of the N adjacent access points.

Access Point

The invention will now be described as seen from a point of view of the first access point 122 in the first cell 112. The first access point 122 requires starting of scheduling traffic on a specific channel and therefore requires to know which channels that are available i.e. channels that are not used in adjacent cells. The first access point 122 sends a request to the first user equipment A1 requesting a report. The report indicating whether the specific channel is used in a second adjacent cell 114, 116 of said number of cells 112, 114, 116. The first access point 122 receives, from the at least one first user equipment A1, the report. The report is based on a first information sent from at least one second access point 124, 126 associated with the second adjacent cell 114, 116. The first information, that is to be detected by the first user equipment A1, indicates whether the specific channel is used or not in the second adjacent cell 114, 116. When the first access point 122 starts using the specific channel in the first cell 112, it sends a second information to be detected by a second user equipment B1, C1, C2 in a second cell 114, 116 being adjacent to the first cell 112. The second information indicates that the specific channel is used in the first cell 112. The expressions first information and second information is used in this example to distinguish information that is reported to the first access point about available channels from the information that the first access point 122 sends out itself that the first access point 122 uses a selected channel.

In one embodiment, the information is sent by defining a reference symbol, e.g. a so called pilot. The reference symbol is a known signal pattern that is known by all user equipments in the system. In this case a reference symbol is associated with each of a respective uplink and downlink channels of the specific channel. When a specific channel is used in the cell 112, see FIG. 1, the access point 122 keeps sending a reference symbol that corresponds to that specific channel, also called the "busy reference symbol".

For detecting the first information, the user equipments measure on reference symbols sent by adjacent access points. In the scenario in FIG. 1, user equipment B1 in adjacent cell 114 and user equipments C1 and C2 in adjacent cell 116 measure on the busy reference symbol sent by access point 122. The user equipment B1 reports the reference symbol it has heard to "its" access point 124, and user equipments C1 and C2 both report the reference symbol they have heard to their access point 126. Thereby, each access point knows which channels are used in the adjacent cells and they can start scheduling traffic on a channel that is not used in an adjacent cell i.e. avoid scheduling traffic on the same channel, which would result in inter-cell interference.

In one embodiment, the first access point 122 does not start scheduling traffic on the specific channel for a certain time frame, called detection window, which is allocated in order to detect any possible collision with another access point, in this example the second access points 124, 126. That is, to detect when the second access points 124, 126 allocates the same channel and activates the same reference symbol at the same time. In such a case the first user equipment A1 will detect either a jammed reference symbol or if the access point identity can be decoded from the reference symbol it will detect that two second access points 124, 126 are sending the same reference symbol simultaneously. When the first user equipment A1 reports a collision to the first access point 122, the first access point 122 will enter a backoff phase, during which it stops sending the reference symbol and draws a random number until it refrains from any further attempt to allocate that channel. This time frame is called the backoff window and the time is defined by the random number. i.e. the backoff window is used by the first access point 122 to resolve situations when more than one access point requires using to the same channel simultaneously. After the backoff window has elapsed and the first access point 122 detects that the channel is unused based on the first user equipment A1 reference symbol reports, it repeats the same mechanism again i.e., evaluates first user equipment A1 reference symbol report, selects an available channel, starts sending corresponding reference symbol, to acquire the channel. If the specific channel is still used nothing happens, that is, this specific channel will still be unavailable for the first access point 122, just as any other channel could be unavailable as well. The first access point 122 will continuously receive reports on all channels, so this specific channel will be treated as any other channel. When it becomes free some later point in time the first access point 122 may try to get it. Note also that during the backoff window the first access point 122 can still try to acquire other channels, i.e., the backoff window only blocks the access to that particular channel. (This same mechanism is applicable also for the case when the channel occupancy information is sent on broadcast channels, see below.) The user equipments B1, C1, C2 in the adjacent cells 114, 116 will also detect the collision and will report to the second access point 124, 126 (they each report to their own access point), which second access point 124, 126 also will enter the backoff phase. The backoff window may be increased after each successive collision. If no collision of reference symbols is reported by the first user equipment A1 in the detection window, the first access point 122 assumes that it has successfully acquired the selected channel and it starts scheduling traffic on that channel. As mentioned above, the first access point 122 keeps sending the reference symbol continuously in order to indicate to adjacent second user equipments B1, C1, C2 that the corresponding channel is in use. When the load decreases and the first access point 122 no longer requires the selected channel the first access point 122 stops sending the second information corresponding to the selected channel, i.e. in this example the first access point 122 stops sending the busy reference symbol corresponding to the selected channel and thereby the selected channel becomes available for possible use by adjacent second access points 124, 126.

Figure 2:
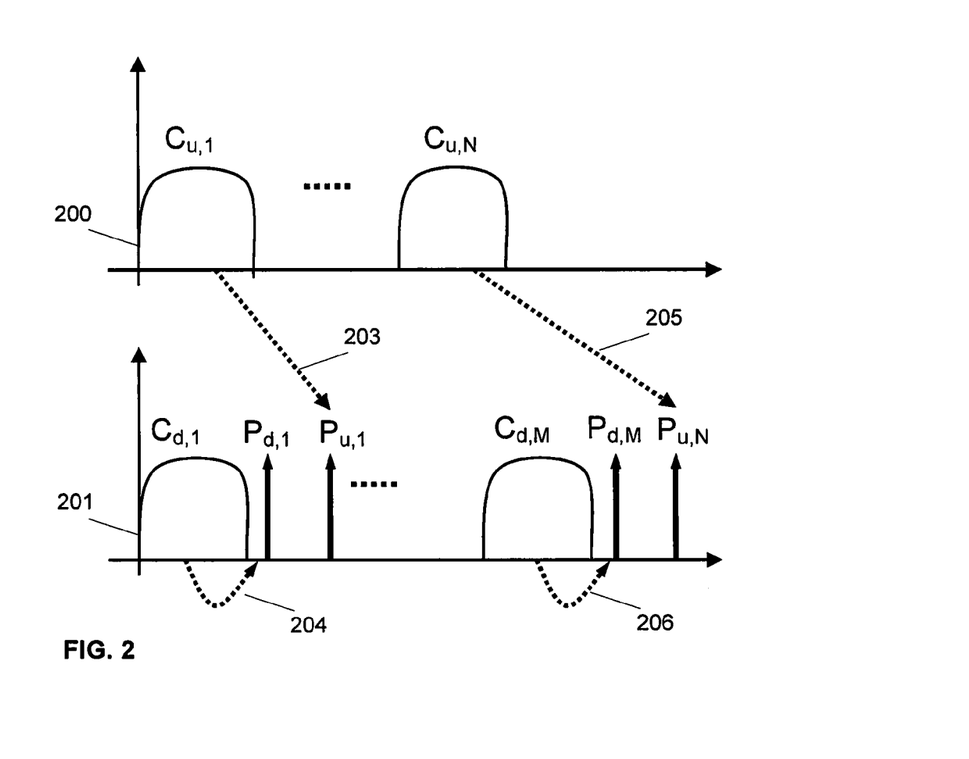
FIG. 2 is a diagram illustrating reference symbols according to the present invention.

Referring to FIG. 2 depicting uplink channels 200 and downlink channels 201. Reference symbols for each channel both in uplink $C_{u,i}$ and downlink $C_{d,j}$ a corresponding reference symbol channel is associated, denoted by $P_{u,i}$ and $P_{d,j}$, respectively. This means that uplink channel number 1 $C_{u,1}$ corresponds to reference symbol $P_{u,1}$ as pointed out by arrow 203, downlink channel number 1 $C_{d,1}$ corresponds to reference symbol $P_{d,1}$ pointed out by arrow 204, uplink channel number N $C_{u,N}$ corresponds to reference symbol $P_{u,N}$ as pointed out by arrow 205 and downlink channel number N $C_{d,N}$ corresponds to reference symbol $P_{d,N}$ pointed out by arrow 206, where N is the number of channels.

When the specific channel is in use in cell 112, the access point 122 keeps sending the corresponding reference symbol continuously, which will enable user equipment B1 in adjacent cell 114 and user equipments C1 and C2 in adjacent cell 116 to sense the reference symbol and report to their own access points 124, 126, the channels that are in use in the adjacent cell as described above.

In one embodiment of the invention, an access point identity of the first access point 122 sending the reference symbol is encoded into the reference symbols, which enables the user equipments B1, C1, C2 listening to the reference symbols to determine which access point 122 that sends the reference symbol. Also the other access points 124 and 126 have encoded their reference symbols in the same way. Then the access point 122 can set the identity of the reference symbols from which adjacent access points 124, 126 it requires reports by. A request to find the first information may comprise the identity of adjacent second access points 124, 126 from which the first user equipment A1 shall detect if the first information is sent.

By associating a downlink reference symbol not only to downlink channels but also to uplink channels as depicted in FIG. 2, user equipments in adjacent cells can detect that in case they would use the corresponding channels in the uplink, their transmission would interfere with the uplink transmissions of other user equipments in the adjacent cell. Without the user equipment reporting of the uplink channels used by adjacent cells, the access point would be unable to detect that the uplink transmission of its own user equipment would interfere with transmissions in adjacent cells.

The use of downlink reference symbols associated with downlink channels is being employed in prior art solutions, but these reference symbols are used for other reasons, such as for synchronization, for channel estimation/demodulation or for link adaptation and for frequency domain scheduling such as channel quality indicator (CQI) reporting. According to the present invention, in these cases where downlink reference symbols already are used but for other reasons, additional specific downlink reference symbols that are used for indicating the occupancy of the corresponding downlink channels, are defined as shown in FIG. 2. Thus, these reference symbols will be separate from the reference symbols that are used for the other reasons e.g. CQI measurements.

In an alternative embodiment of present invention, the access point 122 can use the broadcast channel to broadcast the second information of whether an uplink and downlink channel is used or not, as an alternative to defining reference symbols. The broadcast information may comprise of set of vectors containing channel identities $\phi$ for uplink channels (UL_ch_IDs) and channel identities $\theta$ for down link channels (DL_ch_IDs) that are in-use channel (DL_ch_use) as expressed in (1)-(2). i.e. the vector includes the identities of the currently occupied channels and there is one such vector for uplink and downlink channels.

$$\text{UL\_ch\_IDs} = [\phi_1, \phi_2, \ldots, \phi_k] \quad (1)$$

$$\text{DL\_ch\_IDs} = [\theta_1, \theta_2, \ldots, \theta_L] \quad (2)$$

Where UL_ch_IDs indicates identities of uplink channels, and $\phi_1$ is the identity of first channel, $\phi_2$ the identity of the second channel and $\phi_k$ is the identity of channel number K and where DL_ch_IDs indicates identities of downlink channels, and $\theta_1$, is the identity of the first channel $\theta_2$ is the identity of the second channel and $\theta_L$ is the identity of channel number L. In the above expression it is assumed the channel occupancy of only K out of N total channels in the uplink and only L out of M total channels in the downlink broadcast.

The user equipments B1, C1, C2 in the adjacent cells 114 and 116 read the broadcast channels of the adjacent access point 122 and report the channel occupancy information back to their own access points 124, 126.

The detection window and the backoff window mechanisms that are described above are applicable also in this alternative embodiment.

Figure 3:
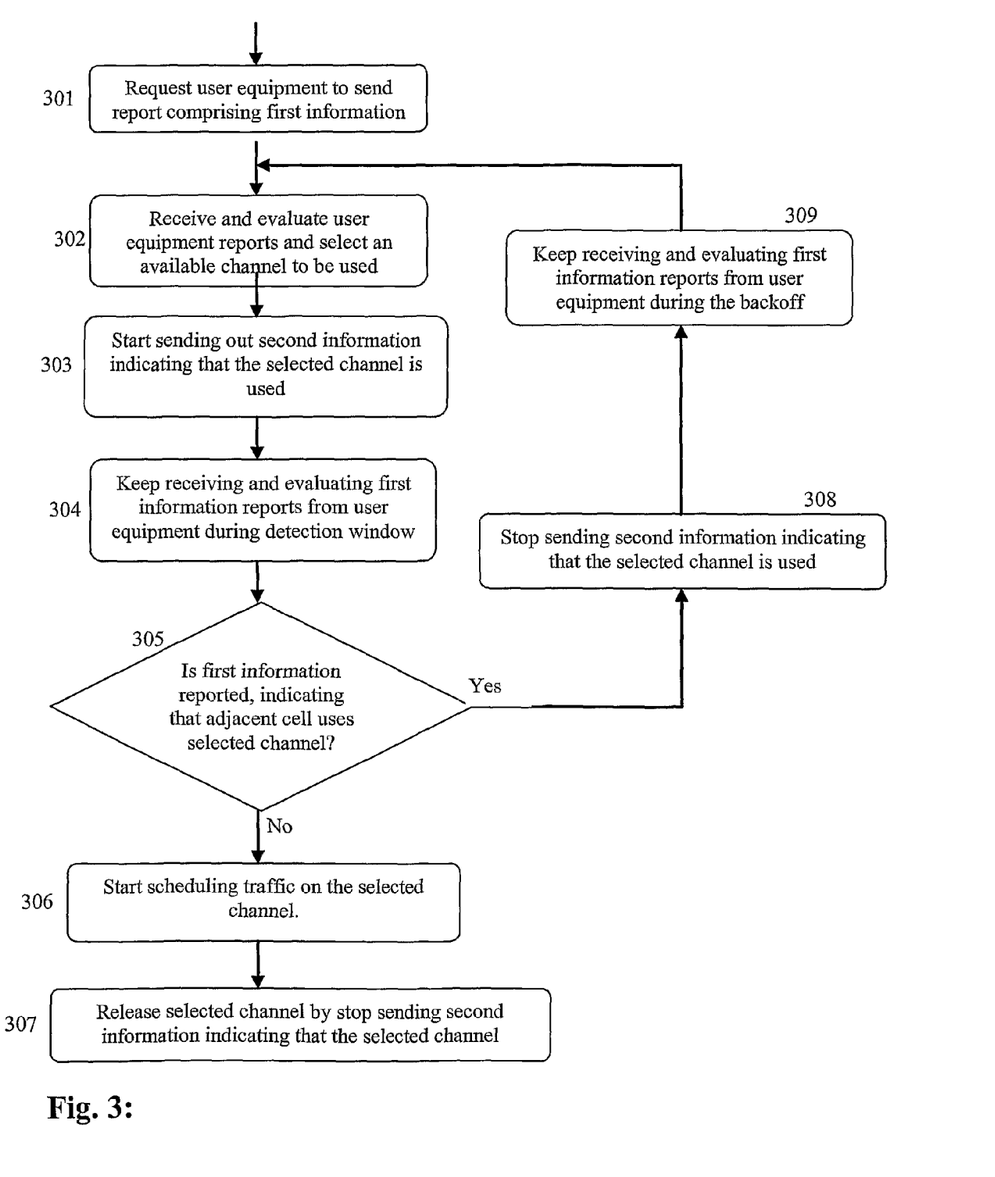
FIG. 3 is a flow chart illustrating a method in an access point according to the present invention.

The method steps performed by the first access point 122 according to the present invention will now be described with reference to the flow chart in FIG. 3.

301. The first access point 122 sends a request to the at least one first user equipment A1 to send a report comprising a first information indicating whether a specific channel is used in a second adjacent cell 114, 116.
302. The first access point receives and evaluates the report from the at least one first user equipment A1 and selects the specific channel if available to be used, based on the evaluated first information.
303. The first access point 122 sends out a second information, indicating that the channel is used, by sending busy reference symbols or related broadcast information associated with the selected channel. The second information may be detected by second user equipments B1, C1, C2 in second cells 114, 116 being adjacent to the first cell 112, which each respective second user equipment B1, C1, C2 report the second information in its second cell to its respective associated second access point 124, 126.
304. The first access point 122 keeps on receiving and evaluating first information reports from the first user equipment A1 during a detection window. The first access point 122 does not start to schedule traffic on the selected channel for a certain time frame, the so-called detection window, which is allocated in order to detect any possible collision with another access point. That is in order to detect whether another adjacent access point, i.e. in this example the second access points 124, 126 allocates the same specific channel and activates the same reference symbol or sends the related information at the same time as the first access point 122.
305. Has any of the at least one user equipment A1 reported that the specific channel is used in a second adjacent cell 114, 116?
306. If answer is no for the question in method step 306, the second access point 122 starts to schedule traffic on the selected specific channel.
307. When the first access point 122 no longer requires the selected channel it releases the specific channel and stops sending out the second information, indicating that the channel is used, by stopping sending busy reference symbols or related broadcast information associated with the selected channel. Thereby the selected channel is available for possible use by other access points, i.e. in this example the second access points 124, 126.
308. If answer is yes for the question in method step 305, the first access point 122 stops sending out the second information using busy reference symbols or related broadcast information associated with the selected channel.
309. The first access point 122 draws a random number until it refrains from any further attempt to allocate the selected channel. This time frame is called the backoff window. The first access point 122 keeps receiving and evaluating first information reports from the first user equipment A1 during the back off window. During the backoff window the first access point is only banned from reserving the selected channel but it can still reserve other available channels. The first access point 122 evaluates the reports and it may select another channel or when the backoff window expires and the channel is available, it can try again to reserve the selected channel by sending out a second information, indicating that the channel is used, by sending busy reference symbols or related broadcast information associated with the selected channel, while it keeps listening for first user equipment A1 reports during the detection window time, i.e., the same procedure over again from method step 302.

In a second embodiment, the same mechanism is used to share the available channels between cells on a packet-by-packet basis. This means that an access point reserves a channel only for the time needed to send a packet. Such a scheme may be most convenient in the uplink where the user equipment has to send a channel request to its access point anyway before it can start transmission. Therefore a report comprising the information detected by the user equipment is preferably comprised in a channel request sent to its access point. This enables the access point to select a channel that is not used in adjacent cells, to be assigned for the uplink transmission of the user equipment, which is signalled back to the user equipment in a channel grant message. The method steps performed by the first access point 122 according to the second embodiment of the present invention will now be described with reference to the flow chart in FIG. 4.

Figure 4:
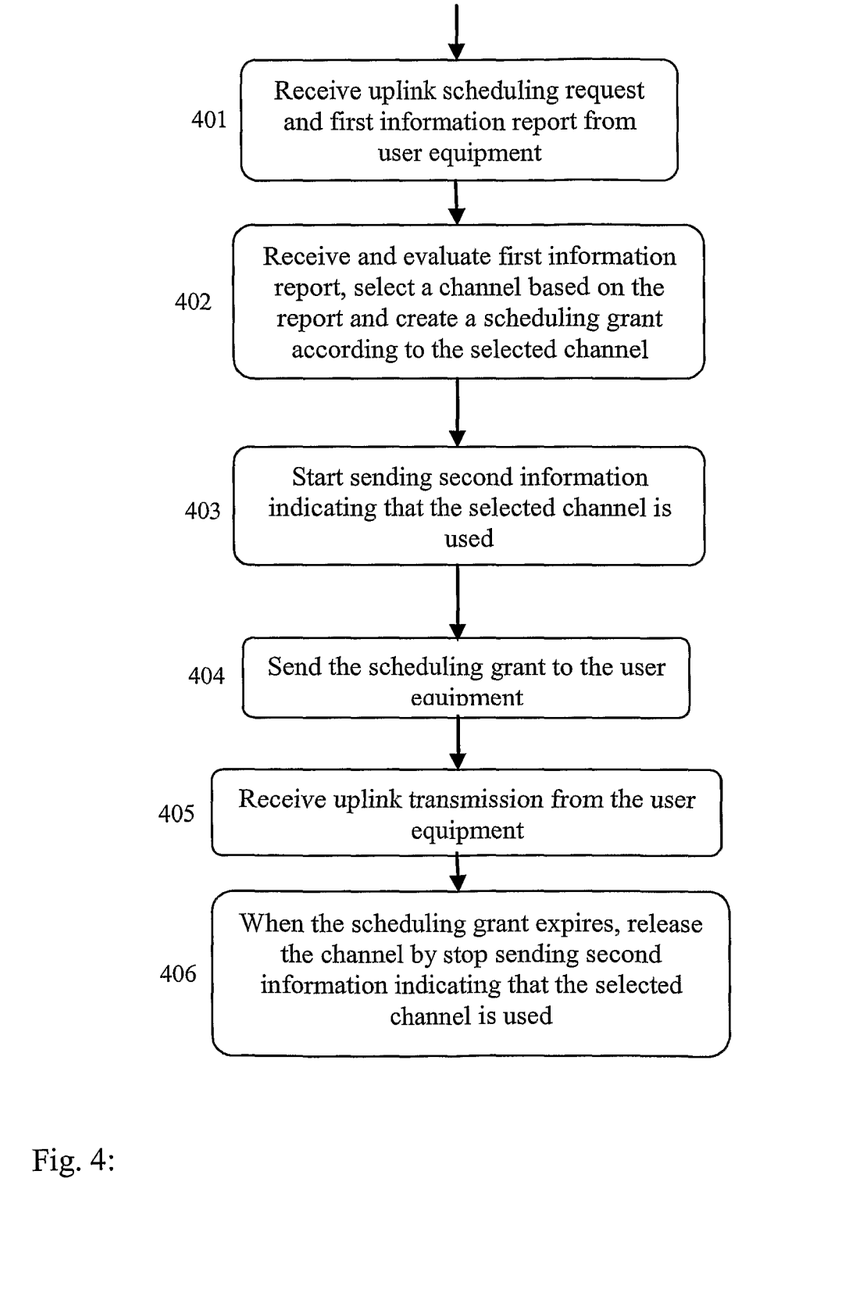
FIG. 4 is a flow chart illustrating a method in an access point when using a channel on a packet-by-packet basis according to the present invention.

401. An uplink scheduling request is received from a first user equipment A1, the request comprises a report, which report comprises a first information indicating whether a specific channel is used in a second adjacent cell 114, 116.

402. The first access point 122 evaluates the reported first information included in the request. Based on the report, the first access point 122 selects an available channel that is not used in the second adjacent cell 114, 116, to be assigned to the first user equipment A1. The first access point 122 then creates a scheduling grant according to the selected channel.

403. The first access point 122 starts sending out a second information indicating the selected channel is used by sending out the busy reference symbol corresponding to the selected uplink channel or related broadcast information associated with the selected channel. The second information may be detected by second user equipments B1, C1, C2 in second cells 114, 116 being adjacent to the first cell 112.

404. The first access point 122 sends a scheduling grant to the first user equipment A1

405. The first access point 122 receives uplink transmission from the user equipment A1.

406. When the scheduling grant expires the first access point 122 releases the selected channel by stop sending the busy reference symbols or related broadcast information.

Figure 5:
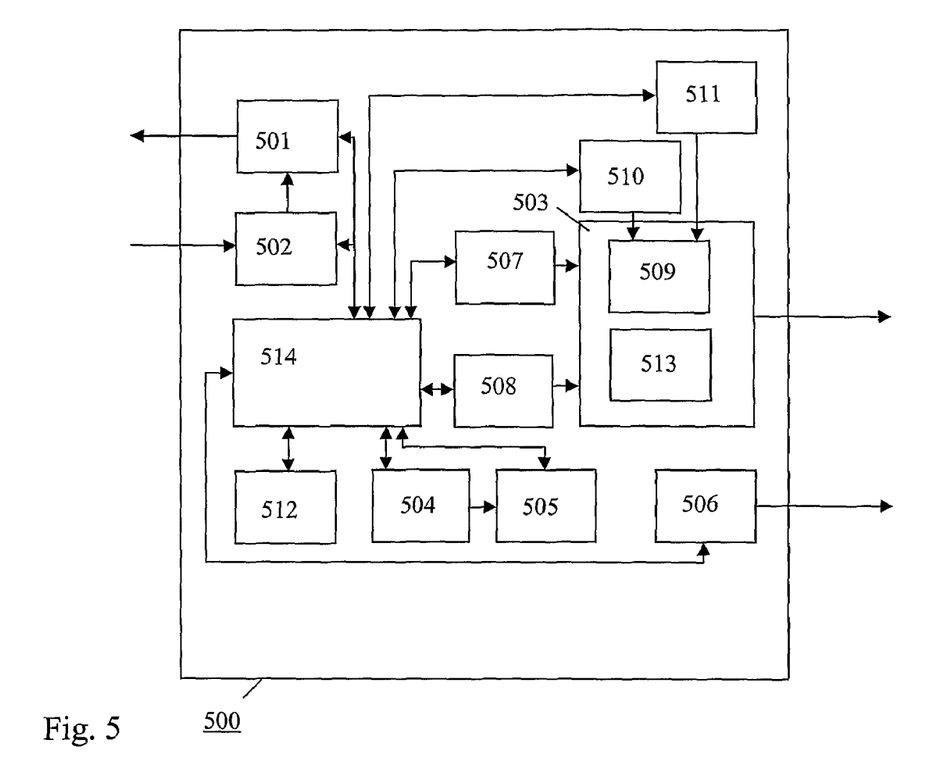
FIG. 5 is a block diagram illustrating an arrangement in an access point according to the present invention.

To perform the method steps, the first access point 122 comprises an arrangement 500 as depicted in FIG. 5. The access point arrangement 500 comprises means for sending 501 a request to the at least one first user equipment A1 in the first cell 112, requesting to find the first information and means for receiving 502 from the at least one first user equipment A1 a report indicating whether a specific channel is used in a second adjacent cell 114, 116 of said number of cells 112, 114, 116, the report being based on the first information sent from at least one second access point 124, 126 associated with the second adjacent cell 114, 116, the information being detected by the user equipment A1 and which information indicating whether a specific channel is used or not in the second adjacent cell 114, 116.

The access point arrangement 500 further comprises means for sending 503 a second information when using the specific channel in the first cell 112, the second information to be detected by a second user equipment B1, C1, C2 in the second cell 114, 116 being adjacent to the first cell 112, the second information indicating that the specific channel is used in the first cell 112.

The access point arrangement 500 further comprises means for evaluating 504 the first information in the report, means for selecting 505 the specific channel to be used, if the specific channel is available according to the evaluation, and means for scheduling traffic 506 on the selected specific channel. It further comprises means for stopping 507 to send the second information when the specific channel is not required for use any more and also means for stopping 508 to send out the second information if receiving a report indicating that the specific channel is used in a second adjacent cell 114, 116 during detection window.

In one embodiment the sending means 502 includes means for sending 509 a reference symbol $P_{u,i}, P_{d,j}$ corresponding to the used specific channel. In that case the arrangement 500 comprises means 510 for associating a reference symbol $P_{u,i}, P_{d,j}$ with each of a respective uplink $C_{u,i}$ and downlink $C_{d,j}$ channels of the specific channel. In another embodiment there is also a means 511 for encoding an access point identity, of the first access point 122 sending the reference symbol, into the reference symbols $P_{u,i}, P_{d,j}$. The access point arrangement 500 may also comprise means 512 for comprising the identity of adjacent second access points 124, 126 from which the first user equipment (A1) shall detect if the first information is sent into the request to find the first information.

In another embodiment the sending means 502 includes means 513 for sending the second information the broadcast channel which second information may comprise a set of vectors containing channel identity and corresponding channel occupancy.

The access point arrangement 500 further comprises a processor 514 which together with computer program code performs the functions of the invention.

User Equipment

In accordance with the present invention and seen from a general point of view of a first user equipment A1 in a first cell 112 will now be described. As described above, the first access point requires to start scheduling traffic on a specific channel and therefore requires to know which channels that are available i.e. channels that are not used in adjacent cells. The first user equipment A1 detects if a first information is sent from at least one second access point 124, 126 associated with a second cell 114, 116 being adjacent to the first cell 112. The first information indicates whether the specific channel is being used or not in the second adjacent cell 114, 116. The first user equipment A1 then reports to the first access point 112 whether the specific channel is used in the second adjacent cell 114, 116 or not, based on the detected first information. The first access point 112 is situated in the same first cell 112 as the first user equipment A1.

The second access point 124, 126 may send the first information by defining reference symbols or using the broadcast channel as described above. Therefore, the detecting of the first information may be performed by measurement on reference signals such as reference symbols that the second access point 124, 126 sends on the downlink channel. Whether a channel is occupied or not can be through the reference symbol being above or below a threshold value, set by the first access point 122. Another way is for the user equipment A1 to listen to the broadcast channel if the second access point 124, 126 sends the information that way.

In one embodiment, the user equipment A1 receives a request from the first access point 122, where the request comprises the identities of the channels/reference symbols about which the first access point 122 requires reports. In another embodiment, the user equipment A1 receives a request from the first access point 122, where the request comprises the identities of the adjacent access points 124, 126 from which the first access point 122 requires reports.

In one embodiment of the invention, an access point identity of the respective adjacent access points 124, 126 sending the reference symbol is encoded into reference symbols, in that case the user equipment A1 listens to the reference symbols to determine which adjacent access points 124, 126 that sends the reference symbols. The user equipment A1 then reports the identity of the respective adjacent access points 124, 126 together with the information whether the channel is occupied or not so that the first access point 122 knows in which cell a certain channel is used. In another embodiment of the present invention, also the quality of reference symbols listened to is added to the report. This could allow the first access point 122 to make more sophisticated decisions by comparing the actual measured signal quality by individual user equipments. i.e. when the first user equipment A1 sends a report without quality information it is only a binary information (yes or no) but when the actual quality is also reported it is more information and the first access point 122 may compare the qualities from different user equipments that have reported.

In a further embodiment, the user equipment A1 reports identity and quality of reference symbols of all N adjacent access points 124, 126 to its own access point, where N e.g. is set by the radio access network 100 or the first access point. Then the access point 122 decides which one to use or not. To limit the information sent in this case, the user equipment reports identities of channels of the reference symbol quality of which is below a threshold value (gamma), where gamma may be set by the radio access network 100 or the first access point A1

In one scenario, more than one second access points 124, 126 is sending the same reference symbol In that case the first user equipment A1 detects either a jammed reference symbol, if the signal strength from the two or more second access points 124, 126 are approximately the same at the user equipment A1, or it can detect the reference symbol correctly if there is one strong reference symbol in the detected signal at the location of the user equipment A1. This implies that at least three states of a reference symbol: detected, not detected or jammed may be reported by the user equipment A1.

Figure 6:
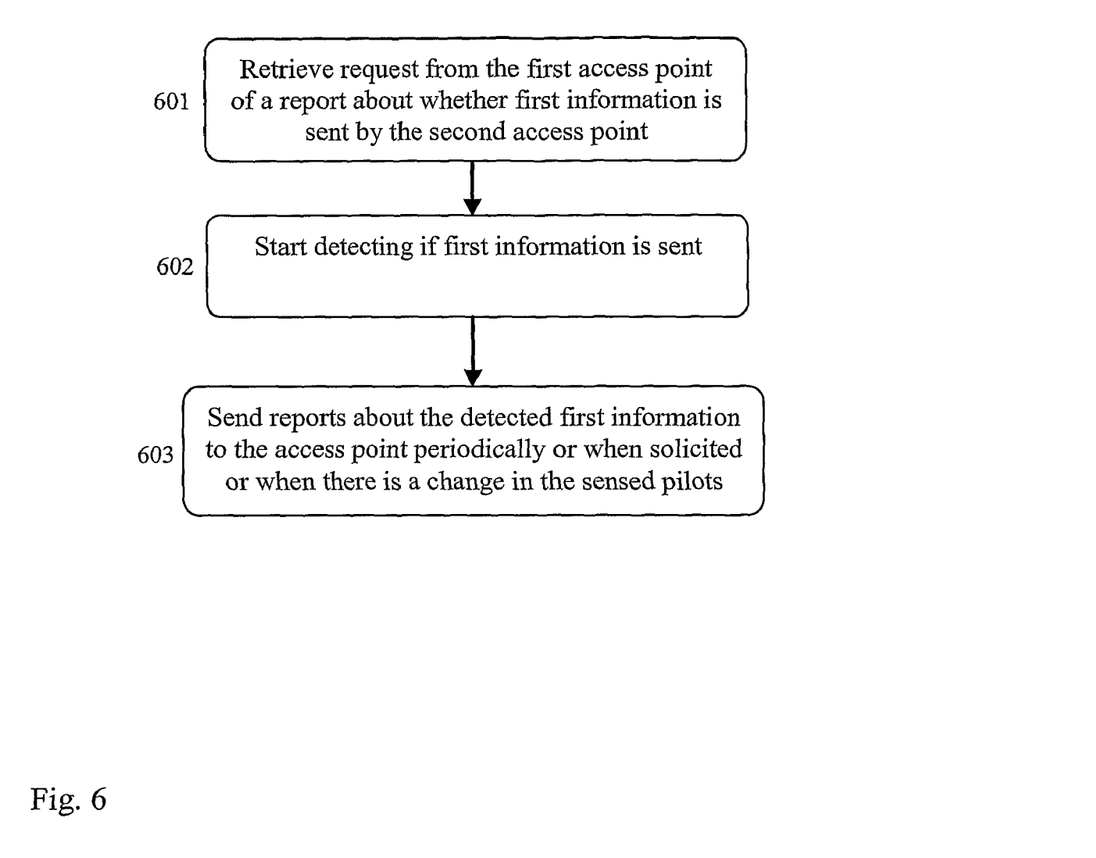
FIG. 6 is a flow chart illustrating a method in a user equipment according to the present invention.

The method steps performed by the first user equipment 122 according to the present invention will now be described referring to the flow chart in FIG. 6.

601. The first user equipment A1 receives a request from the first access point 122 requesting whether a first information is sent from at least one second access point 124, 126 associated with a second cell 114, 116 being adjacent to the first cell 112, where the first information indicates whether a specific channel is being used or not in the second adjacent cell 114, 116.

602. The first user equipment A1 starts to detect if the first information is sent by measuring on busy reference symbols corresponding to the specific channel or read broadcast information related to the specific channel that is sent by the second access point 124, 126.

603. When performed the detecting step, the first user equipment A1 sends a report comprising the first information to the first access point 122 periodically or when solicited, when there is a change in the sensed reference symbols or until the first to access point 122 requests to stop.

In the second embodiment mentioned above, the method of the present invention is used to share available channels between cells on a packet-by-packet basis as mentioned above under the access point. The method steps performed by the first user equipment A1 according to the second embodiment of the present invention will now be described with reference to the flow chart in FIG. 7.

Figure 7:
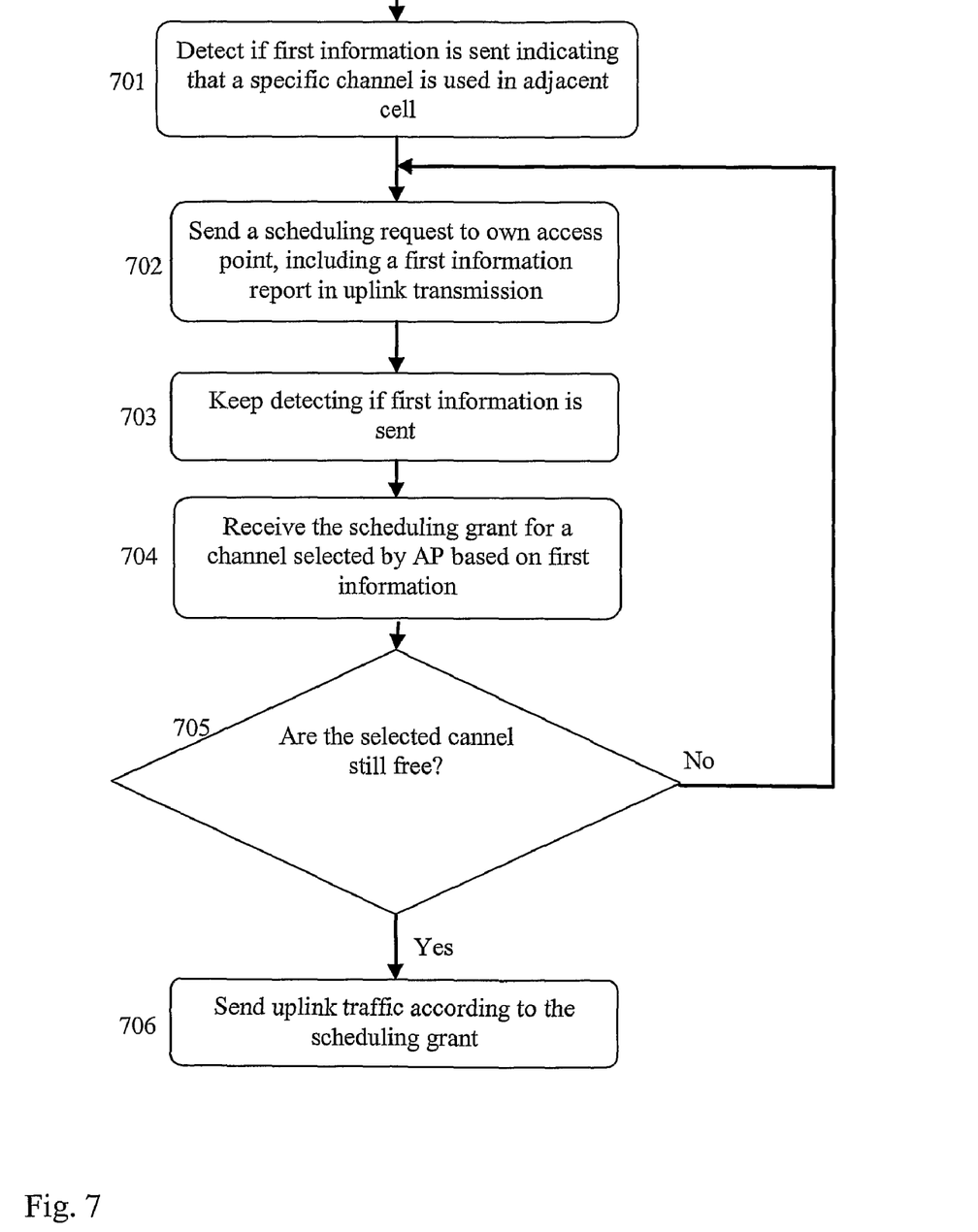
FIG. 7 is a flow chart illustrating a method in a user equipment when using a channel on a packet-by-packet basis according to the present invention.

701. Prior to initiating uplink transmission, the user equipment A1 detects if a first information is sent from at least one second access point 124, 126 associated with a second cell 114, 116 being adjacent to the first cell 112, the first information indicates whether a specific channel is being used or not in the second adjacent cell 114, 116. The first user equipment A1 finds the first information by measuring on busy reference symbols corresponding to the specific channel or listening to broadcast information related to the specific channel that is sent by the second access point 124, 126.

702. The first user equipment A1 sends a scheduling request and a report comprising the detected first information to the first access point 122.

703. The user equipment A1 keeps detecting if first information is sent by the second access point 124, 126 by keeping on measuring on busy reference symbols corresponding to the specific channel or keeping on reading broadcast information related to the specific channel.

704. The user equipment A1 receives a scheduling grant for a channel, selected by the first access point 122 based on the reported first information as a response to the request from the first access point 122.

705. Is the selected channel still free? The answer will be based on whether any no reference symbols have been measured or any conflicting broadcast information have been detected during method step 703 when the first user equipment A1 keeps on detecting the first information? If the channel is no longer free, the method goes back to step 702 by sending a new scheduling request and the latest detected first information.

706. If the selected channel is still free the user equipment A1 sends uplink traffic according to the scheduling grant.

Figure 8:
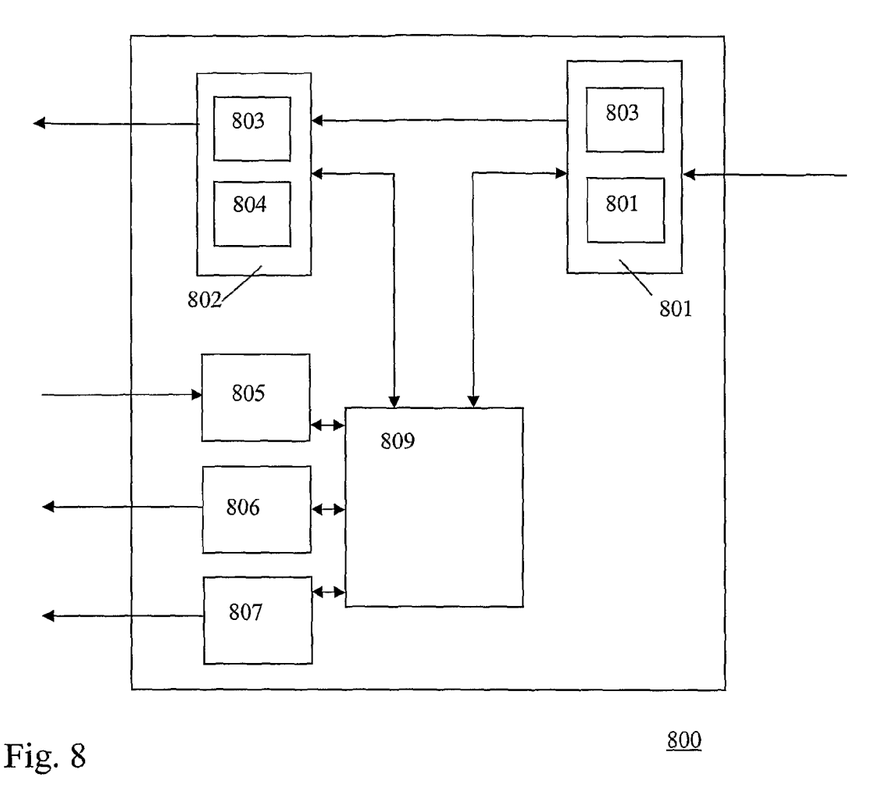
FIG. 8 is a block diagram illustrating an arrangement in a User Equipment according to the present invention.

To perform the method steps according to the present invention, the first user equipment A1 comprises an arrangement 800 as depicted in FIG. 8. The user equipment arrangement 800 comprises means for detecting 801 if the first information is sent from at least one second access point 124, 126 associated with the second cell 114, 116 of said number of cells 112, 114, 116, the second cell 114, 116 being adjacent to the first cell 112, the first information indicating whether a specific channel is used or not in the second adjacent cell 114, 116 and means for reporting 802 whether the specific channel is used in the second adjacent cell 114, 116 or not, to the first access point 122 being situated in the same first cell as the first user equipment A1, based on the detected first information. The reporting means 802 may include means for comprising an access point identity, of the second access point 124, 126 that has sent the first information into a report reported by the reporting means 802.

In one embodiment the detecting means 801 includes means 803 for measuring if a reference symbol $P_{u,i}$, $P_{d,j}$ is sent from the second access point 122.

In another embodiment the detecting means 801 includes means 804 for listening to a broadcast channel if a first information is sent from the second access point 122.

A further embodiment comprises means for receiving 805 a request from the first access point 122 requesting whether the first information is sent from the second access point 124, 126. Then the detecting process is performed when the request is received.

In one embodiment the channels are using a packet-by-packet basis, in this case the user equipment arrangement 800 further comprises means for sending 806 a scheduling request to the first access point 122 comprising the report of whether the specific channel is used in the second adjacent cell 114, 116 or not, the user equipment arrangement 800 may also comprise means for receiving 807 a scheduling grant for the specific channel, selected by the first access point 122 based on the reported first information.

The user equipment arrangement 800 further comprises a processor 809 which together with computer program code performs the functions of the invention.

Figure 9:
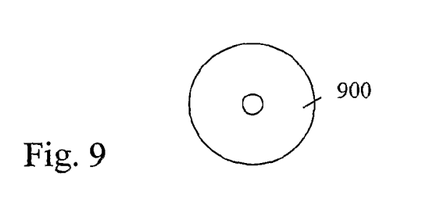
FIG. 9 is a block diagram illustrating a data carrier according to the present invention.

The dynamic inter-cell channel sharing methods according to the present invention can be implemented through one or more processors, such as the processor 514 in the access point arrangement depicted in FIG. 5 and the processor 809 in the user equipment arrangement depicted in FIG. 8, together with computer program code for performing the functions of the invention. The program code mentioned above may also be provided as a computer program product, for instance in the form of a data carrier carrying computer program code for performing the method according to the present invention when being loaded into the access point and/or the user equipment. One such carrier 900, in the form of a CD ROM disc is generally outlined in FIG. 9. It is however feasible with other data carriers such as a memory stick. The computer program code can furthermore be provided as pure program code on a server and downloaded to the access point and/or user equipment remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method for dynamic inter-cell channel sharing for a first access point in a radio access network, the first access point being associated with a first cell of a number of cells within the radio access network, the first access point being adapted to connect a first user equipment being situated in the first cell to a network infrastructure, the method comprising the steps of:
    receiving from the first user equipment, a report indicating whether a specific channel is being used in a second cell adjacent to the first cell, the report being based on a first information sent from a second access point associated with the second adjacent cell, the first information being detected by the first user equipment and indicating whether a specific channel is used or not in the second adjacent cell;
    selecting the specific channel for use in the first cell only when the information indicates the specific channel is not being used in the second cell;
    when using the specific channel in the first cell, sending a second information indicating that the specific channel is being used in the first cell;
    continuing to receive and evaluate first information reports from the first user equipment during a detection window in order to detect whether the second access point allocates the same specific channel;
    upon receiving a report indicating that the specific channel is used in the second cell during the detection window, stop sending the second information; and
    continuing to receive and evaluate reports from the first user equipment during a backoff window defined by drawing a random number until refraining from any further attempt to allocate the selected specific channel.

2. The method according to claim 1, comprising the further step of:
    sending a request to the first user equipment requesting the report.

3. The method according to claim 2, wherein the request includes the identity of the second access point.

4. The method according to claim 1, further comprising the steps of:
    evaluating the report; and
    selecting the specific channel to be used when the specific channel is available according to the evaluation.

5. The method according to claim 1, further comprising the step of:
    when the specific channel is no longer required for use in the first cell, stop sending the second information.

6. The method according to claim 1, wherein the inter-cell channel sharing is used for channels between cells on a packet-by-packet basis, and the method further comprises the step of:
    receiving the first information report in an uplink scheduling request from the first user equipment.

7. The method according to claim 1, wherein the step of sending a second information is performed by sending a reference symbol ($P_{u,i}$, $P_{d,j}$) corresponding to the used specific channel.

8. The method according to claim 7, wherein a reference symbol ($P_{u,i}$, $P_{d,j}$) is associated with each of a respective uplink ($C_{u,i}$) and downlink ($C_{d,j}$) channels of the specific channel.

9. The method according to claim 7, wherein an access point identity of the first access point sending the reference symbol is encoded into the reference symbols ($P_{u,i}$, $P_{d,j}$).

10. The method according to claim 2, wherein the request to the first user equipment requesting the report includes the identity of adjacent second access points from which the first user equipment shall detect if the first information is sent.

11. The method according to claim 1, wherein the second information is sent on a broadcast channel.

12. The method according to claim 11, wherein the second information includes a set of vectors containing channel identity and corresponding channel occupancy.

13. A computer program product stored on a non-transitory memory in a first access point associated with a first cell in a radio access network, the computer program product comprising computer program code for causing a processor in the first access point to control the access point to execute the steps of:
    receiving from a user equipment, a report indicating whether a specific channel is used in a second cell adjacent to the first cell in the radio access network, the report being based on information sent from a second access point associated with the second adjacent cell, the information being detected by the first user equipment and indicating whether a specific channel is used or not in the second cell;
    selecting the specific channel for use in the first cell only when the information indicates the specific channel is not being used in the second cell;
    when using the specific channel in the first cell, sending a second information indicating that the specific channel is being used in the first cell;
    continuing to receive and evaluate first information reports from the first user equipment during a detection window in order to detect whether the second access point allocates the same specific channel;
    upon receiving a report indicating that the specific channel is used in the second cell during the detection window, stop sending the second information; and
    continuing to receive and evaluate reports from the first user equipment during a backoff window defined by drawing a random number until refraining from any further attempt to allocate the selected specific channel.

14. An arrangement in a first access point for dynamic inter-cell channel sharing in a radio access network, the first access point being associated with a first cell of a number of cells within the radio access network, the first access point being adapted to connect a first user equipment being situated in the first cell to a network infrastructure, wherein the access point arrangement is configured to:
    receive from the first user equipment, a report indicating whether a specific channel is used in a second cell adjacent to the first cell, the report being based on a first information sent from a second access point associated with the second adjacent cell, the first information being detected by the user equipment and indicating whether a specific channel is used or not in the second cell;

select the specific channel for use in the first cell only when the information indicates the specific channel is not being used in the second cell; and send a second information when using the specific channel in the first cell, the second information to be detected by a second user equipment in the second cell being adjacent to the first cell, the second information indicating that the specific channel is used in the first cell, wherein the access point arrangement is configured to send a reference symbol ($P_{u,i}$, $P_{d,j}$) corresponding to the used specific channel.

15. The access point arrangement according to claim 14, wherein the access point arrangement is further configured to:
send a request to the first user equipment in the first cell, requesting the first user equipment to find the first information.

16. The access point arrangement according to claim 14, wherein the access point arrangement is further configured to schedule traffic on the selected specific channel.

17. The access point arrangement according to claim 14, wherein the access point arrangement is further configured to stop sending the second information when the specific channel is no longer required for use in the first cell.

18. The access point arrangement according to claim 14, wherein the access point arrangement is further configured to stop sending the second information if the arrangement receives a report indicating that the specific channel is used in the second cell during a detection window.

19. The access point arrangement according to claim 14, wherein the inter-cell channel sharing is used for channels between cells on a packet-by-packet basis, wherein the first information report is receivable in an uplink scheduling request from the first user equipment.

20. The access point arrangement according to claim 14, wherein the access point arrangement is further configured to associate a reference symbol ($P_{u,i}$, $P_{d,j}$) with each of a respective uplink ($C_{u,i}$) and downlink ($C_{d,j}$) channels of the specific channel.

21. The access point arrangement according to claim 14, wherein the access point arrangement is further configured to encode an access point identity, of the first access point sending the reference symbol, into the reference symbols ($P_{u,i}$, $P_{d,j}$).

22. The access point arrangement according to claim 14, wherein the access point arrangement is configured to send the second information on the broadcast channel.

23. The access point arrangement according to claim 22, wherein the second information comprises a set of vectors containing channel identity and corresponding channel occupancy.

24. An arrangement in a first user equipment for dynamic inter-cell channel sharing in a radio access network, the radio access network comprising a number of cells, the first user equipment being situated in a first cell of said number of cells, wherein the first user equipment is connectable to a network infrastructure via a first access point associated with the first cell, wherein the user equipment arrangement is configured to:
detect whether a first information is sent from a second access point associated with a second cell of said number of cells, the second cell being adjacent to the first cell, the first information indicating whether a specific channel is used or not in the second adjacent cell, wherein the user equipment arrangement is configured to determine whether a reference symbol ($P_{U,i}$, $P_{d,j}$) is sent from the second access point; and send a report regarding whether the specific channel is used in the second adjacent cell or not, to the first access point, based on the detected first information.

25. The user equipment arrangement according to claim 24, wherein the user equipment arrangement is configured to include an access point identity of the second access point in the report.

26. The user equipment arrangement according to claim 24, wherein the user equipment arrangement is configured to listen to a broadcast channel if a first information is sent from the second access point.

27. The user equipment arrangement according to claim 24, wherein the user equipment arrangement is configured to receive a request from the first access point requesting whether the first information is sent from the second access point.

28. The user equipment arrangement according to claim 24, wherein the inter-cell channel sharing is usable for channels between cells on a packet-by-packet basis, and the user equipment arrangement is further configured to send a scheduling request to the first access point including the report of whether the specific channel is used in the second adjacent cell or not.

29. The user equipment arrangement according to claim 24, wherein the user equipment arrangement is configured to receive a scheduling grant for the specific channel, selected by the first access point based on the reported first information.

* * * * *